United States Patent
Aimura et al.

(10) Patent No.: US 12,106,585 B2
(45) Date of Patent: Oct. 1, 2024

(54) DRIVING ASSISTANCE SYSTEM, DRIVING ASSISTANCE METHOD, AND STORAGE MEDIUM

(71) Applicant: HONDA MOTOR CO., LTD., Tokyo (JP)

(72) Inventors: Makoto Aimura, Tokyo (JP); Tomo Masutani, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 368 days.

(21) Appl. No.: 17/678,153

(22) Filed: Feb. 23, 2022

(65) Prior Publication Data

US 2022/0319197 A1 Oct. 6, 2022

(30) Foreign Application Priority Data

Mar. 30, 2021 (JP) ................. 2021-058144

(51) Int. Cl.
*G06V 20/58* (2022.01)
*B60W 30/09* (2012.01)
(Continued)

(52) U.S. Cl.
CPC .......... *G06V 20/588* (2022.01); *B60W 30/09* (2013.01); *G06V 10/752* (2022.01); *G06V 20/58* (2022.01);
(Continued)

(58) Field of Classification Search
CPC .......... B60W 30/18109; B60W 10/18; B60W 30/09; B60W 40/04; G06V 20/58; G06V 20/588; G01S 2013/9322
(Continued)

(56) References Cited

U.S. PATENT DOCUMENTS 9,079,571 B2 * 7/2015 Trost ................... B60T 7/22
2019/0080611 A1 3/2019 Yamada et al.
(Continued)

FOREIGN PATENT DOCUMENTS

CN 101804813 8/2010
CN 102303605 1/2012
(Continued)

OTHER PUBLICATIONS

Japanese Office Action for Japanese Patent Application No. 2021-058144 mailed Dec. 6, 2022.
(Continued)

*Primary Examiner* — Andrew R Dyer
*Assistant Examiner* — Hussam Aldeen Alzateemeh
(74) *Attorney, Agent, or Firm* — Amin, Turocy & Watson, LLP

(57) ABSTRACT

Provided is a driving assistance system including a storage device having a program stored therein and a hardware processor, wherein the hardware processor executes the program stored in the storage device, to thereby recognize an object which is present outside of a vehicle on the basis of a detection result of at least one of a radar device and an imaging device which are mounted in the vehicle, perform driving assistance for the vehicle on the basis of a recognition result, and determine a degree of matching between a portion of a contour line of the object and a road partition line and suppress an operation of the driving assistance in a case where the degree of matching is equal to or greater than a threshold.

4 Claims, 4 Drawing Sheets

(51) Int. Cl.
  *G06V 10/75* (2022.01)
  *G06V 20/56* (2022.01)
(52) U.S. Cl.
  CPC . *B60W 2420/403* (2013.01); *B60W 2420/408* (2024.01); *B60W 2552/53* (2020.02); *B60W 2554/20* (2020.02)
(58) Field of Classification Search
  USPC .......................................................... 701/70
  See application file for complete search history.

(56) References Cited

U.S. PATENT DOCUMENTS

| | | | |
|---|---|---|---|
| 2020/0117203 | A1 | 4/2020 | Yang et al. |
| 2020/0180433 | A1 | 6/2020 | Hou et al. |
| 2020/0242941 | A1 | 7/2020 | Kim |
| 2022/0314997 | A1* | 10/2022 | Masutani ........ B60W 30/18109 |

FOREIGN PATENT DOCUMENTS

| | | |
|---|---|---|
| CN | 103386975 | 11/2013 |
| CN | 105741595 | 7/2016 |
| CN | 109472975 | 3/2019 |
| CN | 109532511 | 3/2019 |
| CN | 109917359 | 6/2019 |
| JP | 2004-136788 | 5/2004 |
| JP | 2007-137116 | 6/2007 |
| JP | 2008-021102 | 1/2008 |
| JP | 2008-007062 | 1/2018 |
| JP | 2019-108103 | 7/2019 |
| JP | 2019-112007 | 7/2019 |
| JP | 2019-148900 | 9/2019 |

OTHER PUBLICATIONS

Chinese Office Action for Chinese Patent Application No. 202210164471.0 mailed Mar. 13, 2024.

* cited by examiner

DRIVING ASSISTANCE SYSTEM, DRIVING ASSISTANCE METHOD, AND STORAGE MEDIUM

CROSS-REFERENCE TO RELATED APPLICATION

Priority is claimed on Japanese Patent Application No. 2021-058144 filed Mar. 30, 2021, the content of which is incorporated herein by reference.

BACKGROUND

Field of the Invention

The present invention relates to a driving assistance system, a driving assistance method, and a storage medium.

Description of Related Art

A technique for reducing misrecognition performed by an outside recognition device mounted in a vehicle is known. For example, Japanese Unexamined Patent Application, First Publication No. 2008-007062 discloses that, only in a case where an object detected by a millimeter-wave radar is a stationary object and a vehicle speed detected by a vehicle speed sensor is less than a threshold, a preceding vehicle recognition ECU sets the object as a preceding vehicle candidate.

SUMMARY

The technique disclosed in Patent Literature 1 is designed to reduce misrecognition of an object when a vehicle selects a target with respect to which following traveling is performed. However, in the related art, for example, it may not be possible to reduce misrecognition of an object, in some cases, when a vehicle is traveling in an underpass which is a traffic route allowing the vehicle to pass through an overlying structure.

The present invention was contrived in view of such circumstances, and one object thereof is to provide a driving assistance system, a driving assistance method, and a storage medium that make it possible to reduce an operation of driving assistance based on misrecognition of an object when a vehicle is traveling in an underpass which is a traffic route allowing the vehicle to pass through an overlying structure.

The following configurations are adopted in a driving assistance system, a driving assistance method, and a storage medium according to this invention.

(1) According to an aspect of this invention, there is provided a driving assistance system including: a storage device having a program stored therein; and a hardware processor, wherein the hardware processor executes the program stored in the storage device, to thereby recognize an object which is present outside of a vehicle on the basis of a detection result of at least one of a radar device and an imaging device which are mounted in the vehicle, perform driving assistance for the vehicle on the basis of a recognition result, and determine a degree of matching between a portion of a contour line of the object and a road partition line and suppress an operation of the driving assistance in a case where the degree of matching is equal to or greater than a threshold.

(2) In the aspect of the above (1), the hardware processor suppresses the operation of the driving assistance in a case where it is determined that there is a vanishing point on an extension line of a portion of the contour line of the object.

(3) In the aspect of the above (1), the hardware processor determines whether the vehicle is traveling in an underpass which is a traffic route allowing the vehicle to pass through an overlying structure, and determines the degree of matching between the object and the road partition line in a case where it is determined that the vehicle is traveling in the underpass which is a traffic route allowing the vehicle to pass through an overlying structure.

(4) According to another aspect of this invention, there is provided a vehicle assistance method including causing a computer mounted in a vehicle to: recognize an object which is present outside of a vehicle on the basis of a detection result of at least one of a radar device and an imaging device which are mounted in the vehicle; perform driving assistance for the vehicle on the basis of a recognition result; and determine a degree of matching between the object and a road partition line and suppress an operation of the driving assistance in a case where the degree of matching is equal to or greater than a threshold.

(5) According to another aspect of this invention, there is provided a computer readable non-transitory storage medium having a program stored therein, the program causing a computer mounted in a vehicle to: recognize an object which is present outside of a vehicle on the basis of a detection result of at least one of a radar device and an imaging device which are mounted in the vehicle; perform driving assistance for the vehicle on the basis of a recognition result; and determine a degree of matching between the object and a road partition line and suppress an operation of the driving assistance in a case where the degree of matching is equal to or greater than a threshold.

According to (1) to (5), it is possible to reduce an operation of driving assistance based on misrecognition of an object when a vehicle is traveling in an underpass which is a traffic route allowing the vehicle to pass through an overlying structure.

DETAILED DESCRIPTION OF EMBODIMENTS

Hereinafter, an embodiment of a driving assistance system, a driving assistance method, and a storage medium of the present invention will be described with reference to the accompanying drawings.

Configuration

Figure 1:
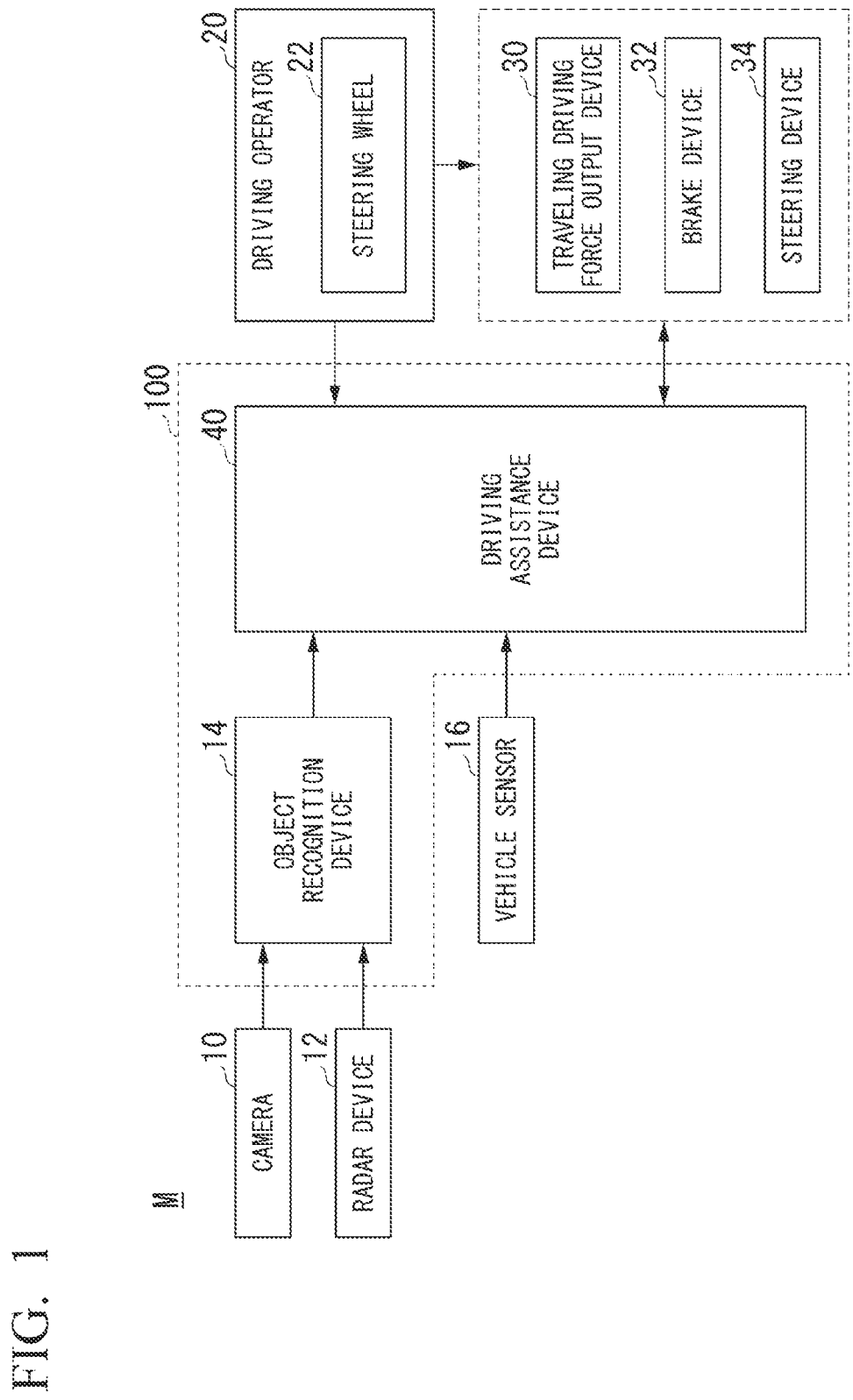
FIG. 1 is a diagram illustrating an example of a configuration of a driving assistance system mounted in a host vehicle.

FIG. 1 is a diagram illustrating an example of a configuration of a driving assistance system 100 mounted in a host vehicle M. The host vehicle M includes, for example, a camera 10, a radar device 12, an object recognition device 14, a vehicle sensor 16, a driving operator 20, a steering wheel 22, a traveling driving force output device 30, a brake device 32, a steering device 34, and a driving assistance device 40. The object recognition device 14 is an example of a "recognition unit," and the driving assistance device 40 is an example of a "driving assistance unit." The driving assistance system 100 includes at least the object recognition device 14 and the driving assistance device 40.

The camera 10 is a digital camera using a solid-state imaging element such as, for example, a charge coupled device (CCD) or a complementary metal oxide semiconductor (CMOS). The camera 10 is installed at any point on a vehicle having the driving assistance system 100 mounted therein (hereinafter referred to as a host vehicle M). In a case where a forward image is captured, the camera 10 is installed on the upper portion of the front windshield, the rear surface of the rear-view mirror, or the like. The camera 10, for example, repeatedly captures an image of the vicinity of the vehicle M periodically. The camera 10 may be a stereo camera. The camera 10 transmits a captured image to the object recognition device 14. The camera 10 is an example of an "imaging device."

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point of the host vehicle M. The radar device 12 may detect the position and speed of an object with a frequency modulated continuous wave (FM-CW) system. The radar device 12 transmits a detection result to the object recognition device 14.

The object recognition device 14 recognizes the position, type, speed, or the like of an object by performing a sensor fusion process on the results of detection performed by some or all of the camera 10 and the radar device 12. The object recognition device 14 performs image processing on an image received from the camera 10 to thereby recognize pedestrians, other vehicles, road structures (such as road partition lines or walls), and the like reflected in the image. In addition, the object recognition device 14 recognizes pedestrians, other vehicles, road structures (such as road partition lines or walls), and the like which are present in the vicinity of the host vehicle M on the basis of the detection result received from the radar device 12. The object recognition device 14 transmits a recognition result to the driving assistance device 40. Meanwhile, the object recognition device 14 may be composed of only the camera 10, and may perform image processing on the image received from the camera 10 to thereby recognize the position, type, speed, and the like of the object.

The vehicle sensor 16 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The driving operator 20 includes, for example, an accelerator pedal, a brake pedal, a shift lever, and other operator in addition to the steering wheel 22. A sensor that detects the amount of operation or the presence or absence of operation is installed on the driving operator 20, and the detection result is output to the driving assistance device 40 or some or all of the traveling driving force output device 30, the brake device 32, and the steering device 34. The operator does not necessarily have to be annular, and may be in the form of a variant steering wheel, a joystick, a button, or the like.

The traveling driving force output device 30 outputs a traveling driving force (torque) for the host vehicle M to travel to a driving wheel. The traveling driving force output device 30 includes, for example, a combination of an internal-combustion engine, an electric motor, a transmission, and the like, and an electronic control unit (ECU) that controls these components. The ECU controls the above components in accordance with information which is input from the driving assistance device 40 or information which is input from the driving operator 20.

The brake device 32 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the driving assistance device 40 or the information which is input from the driving operator 20, and causes a brake torque according to a braking operation to be output to each wheel. The brake device 32 may include a mechanism that transfers hydraulic pressure generated by the operation of a brake pedal included in the driving operator 20 through a master cylinder to the cylinder as a backup. Meanwhile, the brake device 32 is not limited to the above-described configuration, and may be an electronic control type hydraulic brake device that controls an actuator in accordance with the information which is input from the driving assistance device 40 and transfers hydraulic pressure of the master cylinder to the cylinder.

The steering device 34 includes, for example, a steering ECU and an electric motor. The electric motor changes the direction of a turning wheel, for example, by causing a force to act on a rack and pinion mechanism. The steering ECU drives the electric motor in accordance with the information which is input from the driving assistance device 40 or the information which is input from the driving operator 20, and changes the direction of the turning wheel.

The driving assistance device 40 performs driving assistance for the host vehicle M on the basis of the recognition result of the object recognition device 14. In the present embodiment, the term "driving assistance" refers to autonomous emergency braking (AEB) for automatically operating the brake device 32 in order for the host vehicle M to avoid a collision with an object which is present in its traveling direction or in order to reduce a collision speed. More specifically, a driving assistance unit 110 determines whether an object such as a pedestrian or another vehicle is present in the traveling direction of the host vehicle M on the basis of the recognition result of the object recognition device 14, calculates, in a case where it is determined that there is an object in the traveling direction of the host vehicle M, a time to collision (TTC) that is a time which will be taken until the host vehicle M collides with the object on the basis of information (for example, relative distance and relative speed to the object) acquired from the object recognition device 14 and the vehicle sensor 16, and activates the driving assistance in a case where the time to collision is less than a threshold.

The driving assistance device 40 further determines whether the host vehicle M is traveling in an underpass which is a traffic route allowing the vehicle to pass through an overlying structure. Specifically, for example, the driving assistance device 40 determines that the host vehicle M is traveling in an underpass in a case where the object recognition device 14 detects walls on the right and left in the traveling direction of the host vehicle M, a case where the object recognition device 14 detects an uphill road in the traveling direction of the host vehicle M, a case where map information stored in the host vehicle M indicates the presence of the underpass, or the like.

[Operation of the Driving Assistance Device 40]

Figure 2:
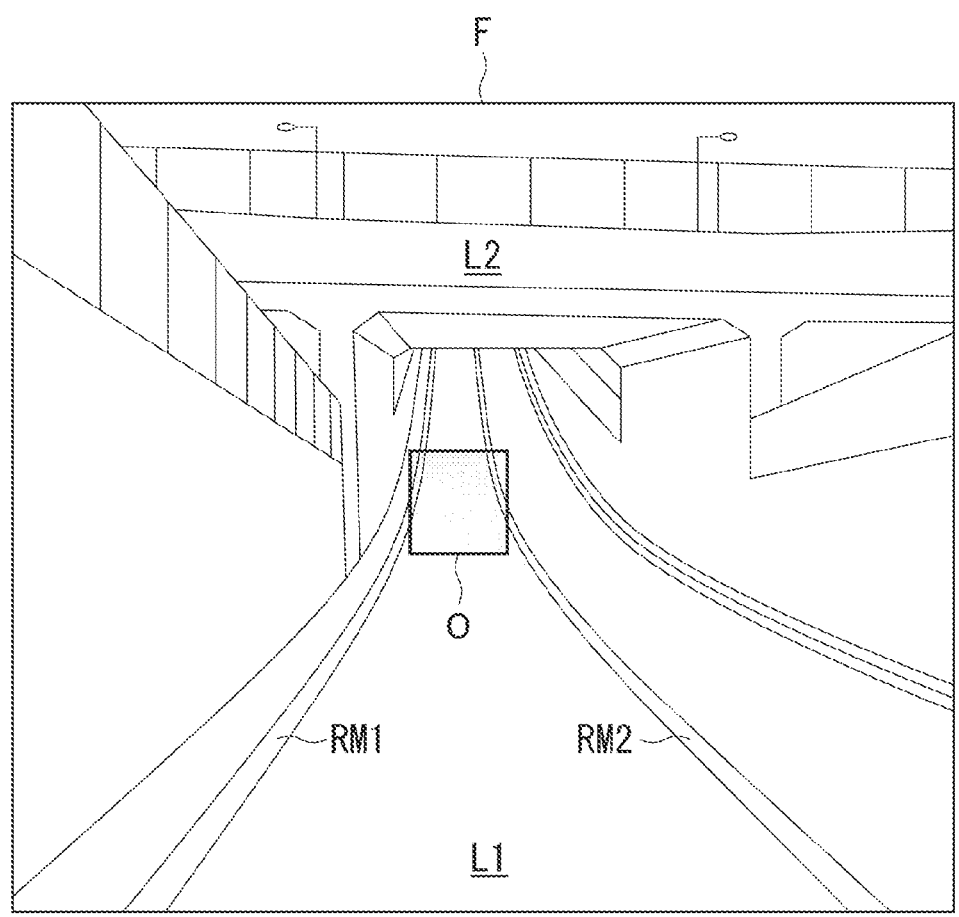
FIG. 2 is a diagram illustrating an example of a situation in which an operation of a driving assistance device is executed.

Next, the operation of the driving assistance device 40 according to the present embodiment will be described with reference to FIGS. 2 to 4. FIG. 2 is a diagram illustrating an example of a situation in which the operation of the driving assistance device 40 is executed. FIG. 2 shows a state in which the host vehicle M travels in a lane L1 and an occupant of the host vehicle M recognizes the outside through a front windshield F. In FIG. 2, the lane L1 and a lane L2 intersect each other, the lane L1 is a traffic route allowing the vehicle to pass through an overlying structure, that is, an underpass, and the lane L2 is an upper traffic route. RM1 indicates a left road partition line of the lane L1, and RM2 indicates a right road partition line of the lane L1 (hereinafter, in a case where the left road partition line RM1 and the right road partition line RM2 need not be distinguished from each other, they may be collectively referred to as a "road partition line RM"). O indicates a shadow formed due to the presence of the lane L2 above the lane L1. The lane L1 does not have to be a traffic route and may be a structure other than a traffic route.

As a comparative example, generally, in a case where a vehicle having an AEB function travels in an underpass, the object recognition device may recognize the shadow of FIG. 2 as an object O such as another vehicle or a pedestrian, and the AEB may be operated. As a result, in spite of another vehicle or a pedestrian not being present in the traveling direction of the vehicle in reality, the vehicle may be braked and an occupant may feel a feeling of discomfort.

Consequently, the driving assistance device 40 according to the present embodiment determines the degree of matching between a portion of the contour line of the recognized object O and the road partition line RM in a case where it is determined that the host vehicle M is traveling in the underpass, and suppresses the operation of driving assistance in a case where the degree of matching is equal to or greater than a threshold. This is because, generally, the contour line of the shadow misrecognized as the object O tends to overlap the road partition line RM. Meanwhile, "suppress" in this case means not activating the driving assistance or activating the driving assistance to a lower degree than usual (for example, applying the brake weakly).

Figure 3:
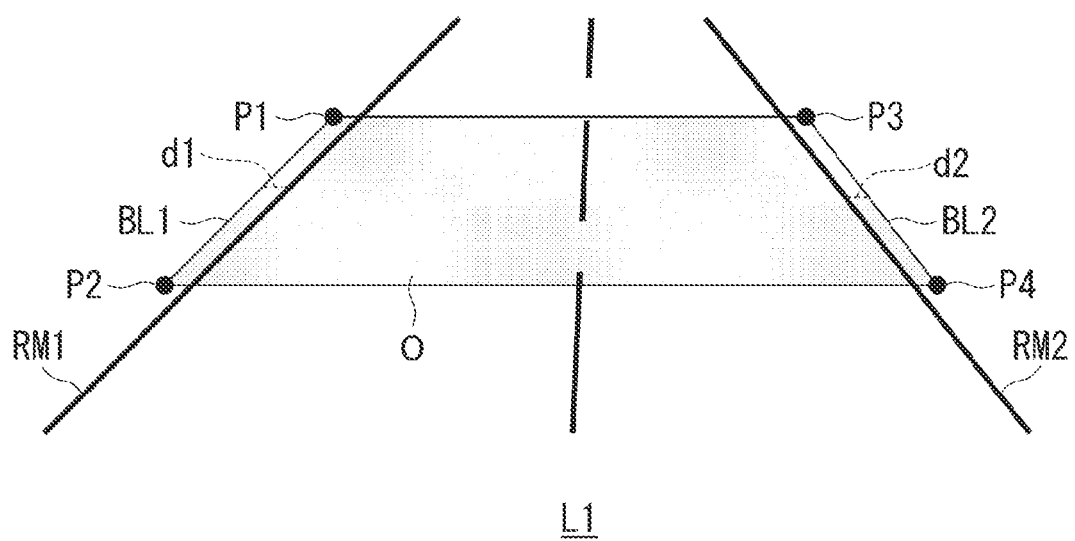
FIG. 3 is a diagram illustrating an example of a situation in which the driving assistance device determines a degree of matching between a portion of a contour line of a recognized object and a road partition line.

FIG. 3 is a diagram illustrating an example in which the driving assistance device 40 determines the degree of matching between a portion of the contour line of the recognized object O and the road partition line RM. In FIG. 3, P1, P2, P3, and P4 indicate the endpoints of the recognized object O, BL1 indicates a segment connecting the point P1 and the point P2, and BL2 indicates a segment connecting the point P3 and the point P4. The segment BL1 and the segment BL2 are portions of the contour line of the recognized object O which are substantially parallel to the road partition line RM, and are an example of "a portion of the contour line." In addition, d1 indicates a distance between the segment BL1 and the road partition line RM1, and d2 indicates a distance between the segment BL2 and the road partition line RM2.

When the distance d1 and/or the distance d2 is within a predetermined value, the driving assistance device 40 determines that the degree of matching between a portion of the contour line of the recognized object O and the road partition line RM is equal to or greater than a threshold, and suppresses the driving assistance. Generally, since the width of a vehicle or a pedestrian is smaller than the width of a lane and the degree of matching is less than a threshold, it is possible to prevent AEB from operating due to the misrecognition of an object by suppressing the driving assistance in a case where the degree of matching is equal to or greater than the threshold.

The driving assistance device 40 further determines whether there is a vanishing point on the extension line of a portion of the contour line of the recognized object O, and suppresses the driving assistance in a case where it is determined that there is a vanishing point on the extension line of a portion of the contour line of the recognized object O. This is because, generally, the extension line of the road partition line RM forms a vanishing point, and for this reason, even in a shadow having a high degree of matching with the road partition line RM, the extension line of a portion of its contour line tends to form a vanishing point.

Figure 4:
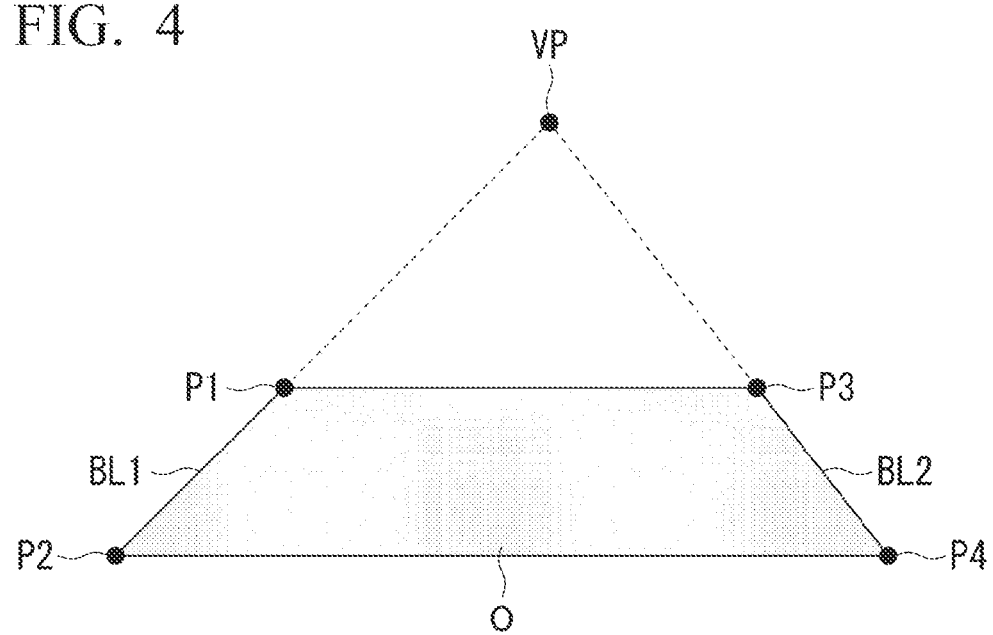
FIG. 4 is a diagram illustrating an example in which the driving assistance device determines whether there is a vanishing point on an extension line of a portion of the contour line of the recognized object.

FIG. 4 is a diagram illustrating an example in which the driving assistance device 40 determines whether there is a vanishing point on the extension line of a portion of the contour line of the recognized object O. The driving assistance device 40 extends the segment BL1 and the segment BL2 which are a portion of the contour line of the recognized object O to the back side in the traveling direction of the host vehicle M, and suppresses the driving assistance in a case where the extension lines of these two segments BL1 and BL2 form a vanishing point VP. Generally, since a vanishing point is not formed even when the boundary line of a recognized vehicle or pedestrian is extended, it is possible to prevent AEB from operating due to the misrecognition of an object by suppressing the driving assistance in a case where the vanishing point is formed.

[Flow of Operation of the Driving Assistance Device 40]

Figure 5:
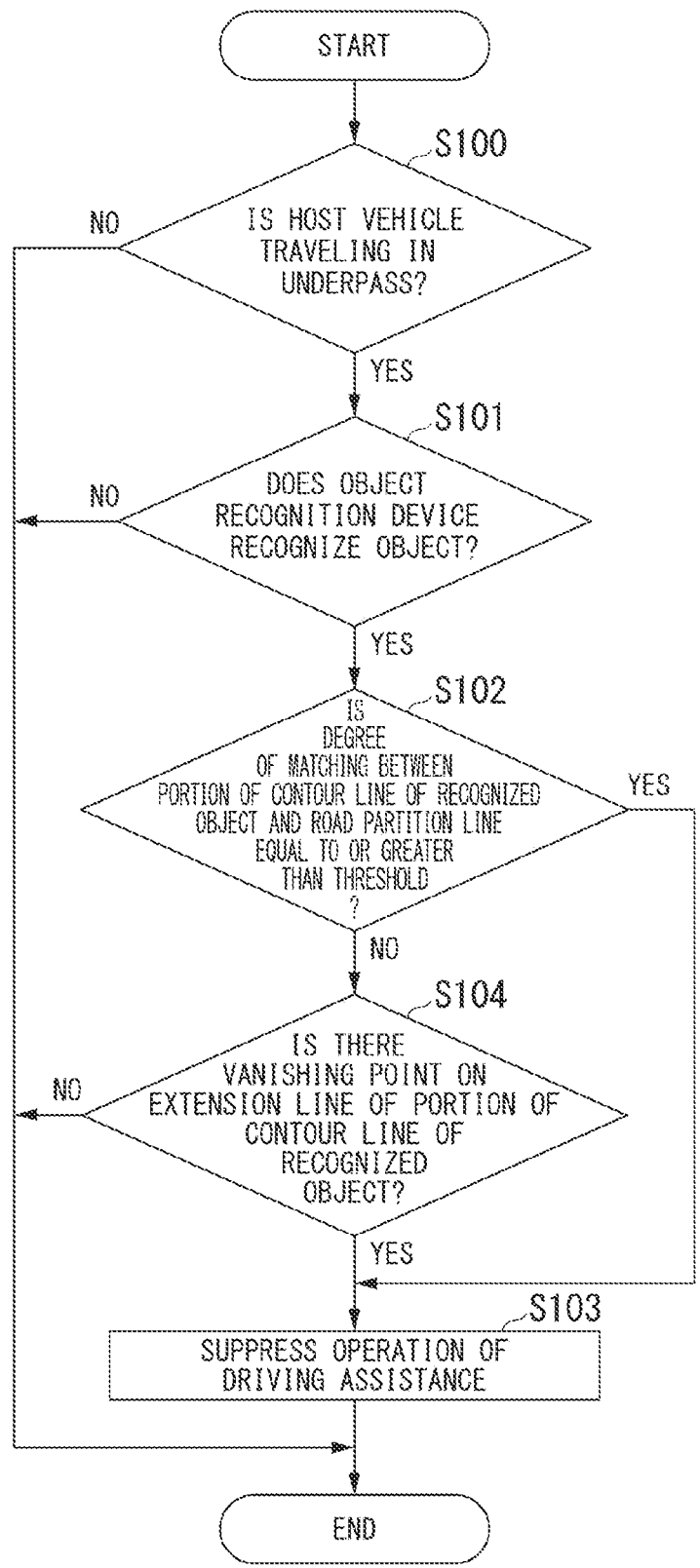
FIG. 5 is a flowchart illustrating an example of a flow of processes which are executed by the driving assistance device.

Next, a flow of processes which are executed by the driving assistance device 40 will be described with reference to FIG. 5. FIG. 5 is a flowchart illustrating an example of a flow of processes which are executed by the driving assistance device 40. The processing of this flowchart is executed in a predetermined control cycle while the host vehicle M is traveling.

First, the driving assistance device 40 determines whether the host vehicle M is traveling in an underpass (step S100). In a case where it is not determined that the host vehicle M is traveling in the underpass, the driving assistance device 40 ends the processing of the present flowchart. On the other hand, in a case where it is determined that the host vehicle M is traveling in the underpass, the driving assistance device 40 determines whether the object recognition device 14 has recognized an object in the traveling direction of the host vehicle M on the basis of the recognition result acquired from the object recognition device 14 (step S101). In a case where it is determined that the object recognition device 14 has not recognized an object in the traveling direction of the host vehicle M, the driving assistance device 40 ends the processing of the present flowchart. On the other hand, in a case where it is determined that the object recognition device 14 has recognized the object in the traveling direction of the host vehicle M, the driving assistance device 40 determines whether the degree of matching between a portion of the boundary line of the recognized object and the road partition line is equal to or greater than a threshold (step S102).

In a case where it is determined that the degree of matching between a portion of the boundary line of the recognized object and the road partition line is equal to or greater than the threshold, the driving assistance device 40 suppresses the operation of the driving assistance (step S103). On the other hand, in a case where it is determined that the degree of matching between a portion of the boundary line of the recognized object and the road partition line is less than the threshold, the driving assistance device 40 next determines whether there is a vanishing point on the extension line of a portion of the boundary line of the recognized object (step S104). In a case where it is determined that there is no vanishing point on the extension line of a portion of the boundary line of the recognized object, the driving assistance device 40 ends the processing of the present flowchart. On the other hand, in a case where it is determined that there is a vanishing point on the extension line of a portion of the boundary line of the recognized object, the driving assistance device 40 suppresses the operation of the driving assistance. This concludes the processing of the present flowchart.

Meanwhile, in the above flowchart, the determination in step S104 is executed after the determination in step S102 is executed, but the order may be reversed. In addition, in the above flowchart, it is determined that the operation of the driving assistance is suppressed in a case where either the determination in step S102 or the determination in step S104 is affirmative, but instead, it may be determined that the operation of the driving assistance is suppressed in a case where both the determinations are affirmative.

According to the present embodiment described above, in a case where it is determined that the host vehicle M is traveling in the underpass, the operation of the driving assistance is suppressed on the basis of the degree of matching between a portion of the boundary line of the recognized external object and the road partition line and whether there is a vanishing point on the extension line of the boundary line. This makes it possible to reduce the operation of the driving assistance based on the misrecognition of the object when the vehicle is traveling in the underpass which is a traffic route allowing the vehicle to pass through an overlying structure.

The above-described embodiment can be represented as follows.

A driving assistance system including:
a storage device having a program stored therein; and
a hardware processor,
wherein the hardware processor executes the program stored in the storage device, to thereby:
recognize an object which is present outside of a vehicle on the basis of a detection result of at least one of a radar device and an imaging device which are mounted in the vehicle;
perform driving assistance for the vehicle on the basis of a recognition result; and
determine a degree of matching between a portion of a contour line of the object and a road partition line and suppress an operation of the driving assistance in a case where the degree of matching is equal to or greater than a threshold.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving assistance system comprising:
a storage device having a program stored therein; and
a hardware processor,
wherein the hardware processor executes the program stored in the storage device, to thereby:
recognize an object which is present outside of a vehicle on the basis of a detection result of at least one of a radar device and an imaging device which are mounted in the vehicle;
perform driving assistance for the vehicle on the basis of a recognition result; and
determine a degree of matching between a portion of a contour line of the object and a road partition line and suppress an operation of the driving assistance in a case where the degree of matching is equal to or greater than a threshold,
wherein the hardware processor suppresses the operation of the driving assistance in a case where it is determined that there is a vanishing point on an extension line of the portion of the contour line of the object.

2. The driving assistance system according to claim 1, wherein the hardware processor determines whether the vehicle is traveling in an underpass which is a traffic route allowing the vehicle to pass through an overlying structure, and determines the degree of matching between the object and the road partition line in a case where it is determined that the vehicle is traveling in the underpass.

3. A computer readable non-transitory storage medium having a program stored therein, the program causing a computer mounted in a vehicle to:
recognize an object which is present outside of a vehicle on the basis of a detection result of at least one of a radar device and an imaging device which are mounted in the vehicle;
perform driving assistance for the vehicle on the basis of a recognition result;
determine a degree of matching between the object and a road partition line and suppress an operation of the driving assistance in a case where the degree of matching is equal to or greater than a threshold; and
suppress the driving assistance in a case where it is determined that there is a vanishing point on an extension line of a portion of a contour line of the object.

4. A vehicle assistance method to be executed by a computer mounted in a vehicle to, the vehicle assistance method comprising:
recognizing an object which is present outside of a vehicle on the basis of a detection result of at least one of a radar device and an imaging device which are mounted in the vehicle;
performing driving assistance for the vehicle on the basis of a recognition result;
determining a degree of matching between the object and a road partition line and suppressing an operation of the driving assistance in a case where the degree of matching is equal to or greater than a threshold;
determining that there is a vanishing point on an extension line of a portion of a contour line of the object; and
suppressing the driving assistance in based on the determination that there is a vanishing point on an extension line of a portion of a contour line of the object.

* * * * *